United States Patent [19]

Newell, III et al.

[11] Patent Number: 4,534,406

[45] Date of Patent: Aug. 13, 1985

[54] THERMOSTAT

[75] Inventors: Alfred T. Newell, III; Alfred T. Newell, Jr., both of Birmingham, Ala.

[73] Assignee: A. T. Newell Co. Inc., Birmingham, Ala.

[21] Appl. No.: 625,606

[22] Filed: Jun. 28, 1984

Related U.S. Application Data

[63] Continuation-in-part of Ser. No. 584,398, Feb. 28, 1984.

[51] Int. Cl.³ .................... F25B 29/00; G08B 17/00
[52] U.S. Cl. ..................................... 165/12; 165/26; 340/588
[58] Field of Search ............. 165/12, 26, 27; 340/588; 236/46 R

[56] References Cited

U.S. PATENT DOCUMENTS 3,706,339 12/1972 Bartles et al. ............... 165/26 X
3,815,815 6/1974 Sapir ........................... 165/26 X
4,167,858 9/1979 Kojima et al. ................ 62/129 X Primary Examiner—William E. Wayner
Attorney, Agent, or Firm—James W. Potthast

[57] ABSTRACT

An electronic thermostat with a mode selection switch for selective application of actuation signals to different output control terminals for connection with control of either cooling or heating apparatus in accordance with sensed temperature. Circuitry is provided to derive A.C. input power to a D.C. power supply from a selected one of the control terminals to eliminate the need for separate A.C. power leads. The mode selection switch also selectively applies cool and heat trigger signals to a shared actuation signal generator. Time delay circuits for delaying the time between generation of a trigger signal and resultant application of an actuation signal share a common circuit element through means of the mode selection switch.

18 Claims, 5 Drawing Figures

THERMOSTAT

CROSS REFERENCE TO RELATED APPLICATION

This application is a continuation-in-part of our co-pending application Ser. No. 06/584,398, filed Feb. 28, 1984.

BACKGROUND OF THE INVENTION

This invention relates generally to a thermostat and, more particularly, to an electronic thermostat for controlling multiple temperature altering devices.

Thermostats are well known which sense temperature, compare the temperature to a preselected temperature reference and then produce an actuation signal in accordance with the comparison to control the application of power to temperature altering devices.

Such electronic thermostats require a source of D.C. power. Since D.C. power is not always available directly, such units generally include a D.C. power supply which produces D.C. power from A.C. power. In many commercial applications, the A.C. power is easily connected to the input of the D.C. power supply by one pair of leads while the output terminals and a reference terminal are connected to control relay coils of the temperature altering apparatus being controlled.

Often such thermostats have a heat control terminal and a cool control terminal and a reference terminal. The heat control terminal is connected with a relay control coil associated with a furnace or other heating apparatus. Likewise, the cool control terminal is connected through another lead to a control relay coil associated with an air conditioning unit or other cooling device.

Unfortunately, in many applications which originally employed mechanical rather than electronic switching thermostats, separate A.C. power leads are not available. In such case, electronic thermostat which require separate A.C. power leads for generation cannot be substituted for the mechanical thermostats without expensive new wiring being installed to provide power. As noted in U.S. Pat. No. 4,091,993 of Knecht et al., one of many attempts to solve this problem in two wire systems has been to employ a separate source of power, such as shown in U.S. Pat. Nos. 4,308,991 of Peinetti et al. and 4,373,664 Barker et al. In Knecht et al. power is always drawn through a single control terminal regardless of whether it is actuated or not. In another U.S. Pat. No. 3,815,815 of Sapir, A.C. power is concurrently drawn through both of two control terminals.

Practical considerations also require that the thermostat not cause the temperature altering devices to be short cycled, i.e., to be rapidly turned on and off, any more than necessary, since such short cycling causes damage to electric motors and the like and increases the wear rate on other parts. For like reasons, it is desired to prevent reapplication of power to such devices immediately after temporary power loss when power voltages may still be below rated voltages for such devices.

SUMMARY OF THE INVENTION

It is therefore a general objective to provide an improved electronic thermostat for selective control of both heating and cooling apparatus in which D.C. power is selectively derived through heat and cool control terminals to thereby eliminate the batteries, transformers or additional power leads disadvantageously required in known thermostats. It is also a general objective to provide such a thermostat with a time delay circuit to prevent short cycling.

In keeping with these objectives, we provide an electronic thermostat comprising a temperature sensor, reference, cool control and heat control terminals, a switch for preselecting one of the control terminals, means for preselecting one of the control terminals to energize a control relay coil of a temperature altering apparatus connected therewith and a D.C. power supply for providing D.C. power to the actuation signal generating means. The D.C. power is derived from A.C. power drawn through the non-preselected and non-activated control terminal at a level insufficient to energize a relay control relay coil of a temperature altering apparatus connected therewith.

Two embodiments are shown. In one embodiment, the selection of the terminal from which to draw A.C. power is inherently achieved by means of a section associated with a mode selection switch. In another embodiment, the selection is done via a full wave rectifier circuit together with a pair of supplemental diodes.

A further object is to provide an electronic thermostat comprising means for generating a heat trigger signal and means for generating a cool trigger signal in response to sensed temperature, means for preselecting for control one of a cool control output terminal and a heat control output terminal, and means responsive to said trigger signals for applying actuation signals to the preselected one of the apparatus connected therewith a preselected time delay period after the preselected temperature is sensed.

In a preferred embodiment, the two time delay circuits for heat and cool control advantageously share a common circuit element through a switch which forms part of a mode selection switch.

Yet another objective is to provide an electronic thermostat with both delay circuits and means for deriving power through a non-preselected terminal.

In a preferred embodiment the switch performs the dual function of interconnecting the time delay circuit elements and selecting the proper control terminal from which the A.C. input power for the D.C. power supply is obtained.

BRIEF DESCRIPTION OF THE DRAWINGS

The foregoing objects, features and advantages of the present invention will be described in greater detail and other objects, features and advantages will be made apparent from the detailed description of the preferred embodiment which is given with reference to the various figures of the drawing, in which.

DETAILED DESCRIPTION

Figure 1:
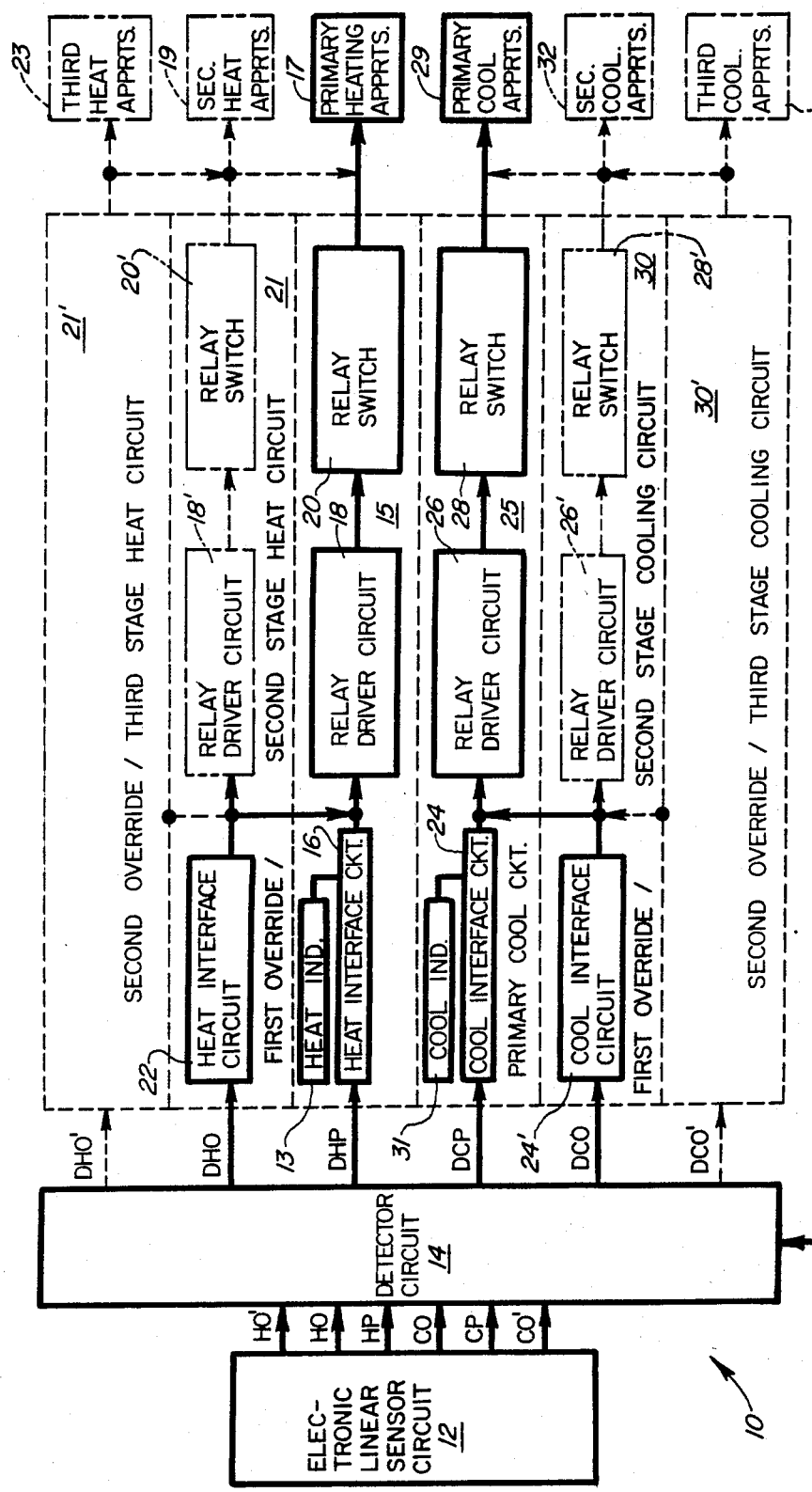
FIG. 1 is block diagram of electronic thermostat circuitry preferred for implementation of the electronic thermostat of our related application.

Referring first to FIG. 1, much of the electronic thermostat circuitry 10 of our related application is preferred for implementation of the present invention. This circuitry 10 includes a unique electronic linear sensor circuit 12. Linear sensor circuit 12 produces four different voltage outputs that vary substantially in direct linear proportion with variations in temperature of the sensor environment over a wide range of temperature as compared to a thermistor. Thermistors, which are known to be used in electronic thermostats, unfortunately produce output signals which vary logarithmically. The temperature calibration and other problems that this logarithmic characteristic causes prior electronic thermostats is overcome with the electronic linear sensor circuit 10. In particular, sensor 12 permits simple and accurate calibration of the thermostat with temperature through use of a linear dial that indicates the temperature setting on a linear scale.

Preferably, four different sensor voltage outputs HO (heat override), HP (heat primary), CP (cool primary) and CO (cool override) are connected to the input of a detector circuit 14. In each case, the detector circuit 14 has four detector stages, or detectors, which produce pulses on four outputs DHO, DHP, DCP and DCO in response to the amplitudes of the associated sensor input voltages of leads HO, HP, CP and CO, respectively, reaching a single preselected reference voltage commonly associated with all of the detectors. Alternately, as indicated in broken line, the sensor produces additional sensor voltage signals on outputs HO' (secondary heat override) and CO' (secondary cool override), which are applied to additional detectors of detector circuit 14 that produce responsive detection signals on outputs DHO' and DCO', respectively. Alternately, fewer or more stages are provided, and the modular design illustrated in FIG. 1 facilitates such flexibility.

The reference voltage is the same for all six detectors for the same temperature setting, while the amplitudes of the four sensor signals on outputs HO', HO, HP, CP, CO and CO' differ from one another by preselected incremental amounts. Accordingly, the detectors generate detection signals at different preselected temperatures. The difference in response temperature for adjacent pairs of detectors may be selected to be the same or to be different depending on the application of the thermostat. For example, an incremental difference of 0.0298 volts between successive detectors at a temperature of 25 degrees Centigrade has been found suitable to the desired result of providing a dead zone of approximately 1.6 degrees Centigrade between all adjacent stages.

The electronic thermostat has two cycles—a heat cycle and a cool cycle. The heat cycle has three stages—a primary heat stage which is activated when a detection pulse is produced on output DHP, a second, or heat override, stage which is activated when a detection pulse is produced on output DHO, and, if provided, a third, or secondary heat override, stage which is activated when a detection pulse is produced on output DHO'.

The cool cycle has a primary cool stage which is activated when a detection pulse is produced on output DC, a second, or cool override, stage which is activated when a detection pulse is produced on output DCO, and, if provided, a third, or secondary cool override, stage which is activated when a detection pulse is produced on output DCO'. The pulses are successively produced on outputs DH, DHO and DHO' in response to the temperature decreasing below the set temperature, first by half of the intercycle temperature increment, or dead zone, then by the additional second interstage temperature increment and, finally, by the additional third interstage increment.

For example, presume the set temperature is set at 25 degrees Centigrade and both the heat interstage and intercycle cycle temperature increments have been selected as 1.6 degrees Centigrade. Then when the sensor temperature drops 0.8 degrees Centigrade, or one half of the intercycle temperature increment, to a temperature of 24.2 degrees Centigrade, the amplitude of the temperature sensor signal on lead HP will be equal to the reference temperature signal, and a detection pulse will be produced on detector output DHO. This primary heat detection pulse is coupled through a primary heat circuit, or actuator, 15 to actuate a primary heating apparatus 17.

The detection pulse on output DHP is coupled to a heat interface circuit 16 which initiates a preselected time delay. If the primary heat detection pulse remains extant for the duration of the time delay, then a trigger pulse is generated to actuate a relay driver circuit 18, which in turn actuates a relay switch 20. The relay switch 20 then connects power from a suitable electrical power source (not shown) to the primary heating apparatus 17. A visual heat indicator 13 is also actuated in response to the heat detection pulse applied to heat interface circuit 16.

In the event the temperature continues to fall, either because the actuated primary heating apparatus is inadequate or because of failure of the detector associated with detector output DHP, then the second stage detector will generate an override detection pulse on output DHO when the temperature drops another interstage temperature increment to 22.6 degrees Centigrade, for instance. This heat override detection pulse is coupled to a heat interface circuit 22 of a first override/second stage heat circuit 21. If this heat override detection pulse remains extant for another, preselected override time delay associated with the heat interface circuit 22, the relay driver circuit 19 generates a pulse to actuate relay switch 20 in the event it has not previously been caused to do so in response to a primary heat detection pulse. This circumstance may arise because the primary time delay is greater than the override time delay, which may be as short as zero time.

Alternately or additionally, as indicated by broken lines, the heat override detection pulse is coupled through its own relay driver circuit 18' to an associated override relay switch 20'. Relay switch 20' is employed to energize an auxiliary heating apparatus 19 to assist the primary heating apparatus 17 associated with heat relay switch 20. Additionally or alternately, it is connected to separately actuate primary heating apparatus 17 in the event it has not been previously actuated.

If the temperature still continues to fall, then a second override, or third stage, heat detection pulse is generated on detector output DHO' when the temperature reaches 21 degrees Centigrade. This second override pulse is applied to a second override/third stage heat circuit 21' which is substantially identical in structure and operation to the first override/secondary stage heat circuit 21. This second override circuit 21' actuates a separate, tertiary heating apparatus 23. In addition or alternately, it is coupled to one or both of the primary heating apparatus 17 and the secondary heating apparatus 19 for providing backup or override actuation, as indicated by the broken line connections thereto. Also, in addition or alternately, a pulse from its heat interface circuit (not shown) is coupled to one or both of relay driver circuits 18 and 18' to provide override or backup actuation thereto, as indicated by broken line connections thereto.

Thus, it is seen that a multistage electronic thermostat is provided which will provide both internal backup and override functions to make the thermostat less prone to failure and, in addition, to provide successive control for a plurality of heat apparatus. The heating apparatus 17, 19 and 23 may be of various types and can include, in addition to electric or fuel powered heaters, ventilation controllers, fans, or the like which can be employed to alter temperature in a controlled environment.

The cooling cycle has analogous elements and operates substantially the same as the heat cycle circuitry except in reverse with respect to temperature. When the sensed temperature rises above the set temperature by an amount equal to half the intercycle temperature increment, a primary cool pulse is generated on detector output DCP. After a preselected time delay, this pulse is coupled through a cool interface circuit 24 to a relay driver circuit 26 which actuates a cool relay switch 28. The cool relay switch is connectable to control a load, such as a primary cooling apparatus 29. A cool indicator circuit 31 is actuated by the cool detection pulse whenever the thermostat is operating in the cooling cycle to provide a visual indication of same.

The cool cycle, like the heat cycle, has three stages: a primary cool stage 25 associated with sensor output CP and detector circuit output DCP, a first override/second stage cooling circuit stage 30 associated with sensor output CO and detector circuit output DCO, and a second override/third stage cooling stage 30' associated with sensor output CO' and detector circuit output DCO'. Primary cooling circuit 25, the first override/second stage cooling circuit 30 and the second override/third stage cooling circuit 30' respectively correspond generally in structure and operation to the heat cycle circuits 20, 21 and 21' with respect to actuation of a primary cooling apparatus 29, a secondary cooling apparatus 32 and a tertiary cooling apparatus 33.

If the sensed temperature rises by another interstage temperature increment, a detection pulse is generated on output DCO which is coupled through a cool interface circuit 35 of the first override/second stage cooling circuit 30 to relay driver circuit 26 after a preselected override time delay. Alternately, or additionally, the detection pulse is coupled through another relay driver circuit 26' to actuate a relay switch 28' respectively corresponding to relay driver circuit 26 and relay switch 28. Relay switch 28 is connected to a secondary cooling apparatus 32 to connect electrical power thereto. Alternately or additionally, it is connected to the primary cool apparatus 29.

If the temperature rises by another interstage temperature increment, a second override/third stage cooling circuit 30' responds to a detection pulse DCO' to actuate a third cool apparatus 33, to provide an override pulse to relay driver circuits 26' or 26, and, additionally or alternately, to provide override actuation to either the secondary or primary cool apparatus 29 and 32.

The temperature is set by means of a calibration/set point circuit 36. Advantageously, since the sensor is linear, the set point scale is linear, and the set point circuit is employed in combination with a simple and effective two point calibration circuit that facilitates simple calibration to different linear scales.

All of the circuits 16, 22, 24 and 35 include time delay circuitry for delaying generation of an output pulse in response to a detection pulse. If the detection pulse is not maintained throughout the time delay period, then the resultant output pulse will be aborted. A time delay of fifteen seconds has been found a satisfactory delay time for the primary circuits 16 and 24 while a delay time of three seconds is preferred for the override circuits 22 and 35. The time delays minimize undesirable rapid cycling due to temperature transients or otherwise.

In addition to performing the override function described above, the override circuits advantageously protect motor loads or the like connected to the relay switches 20 or 28 from "instant on" actuation after momentary loss of power. In the event of loss of power, means are provided for instantly resetting the time delay, such that power will not be coupled to the cooling or heating apparatus until sufficient time has passed for power to come up to full voltage. Damage to motors caused by reapplication of power when voltage is below rated voltage is thereby avoided and reliability further enhanced.

Figure 2:
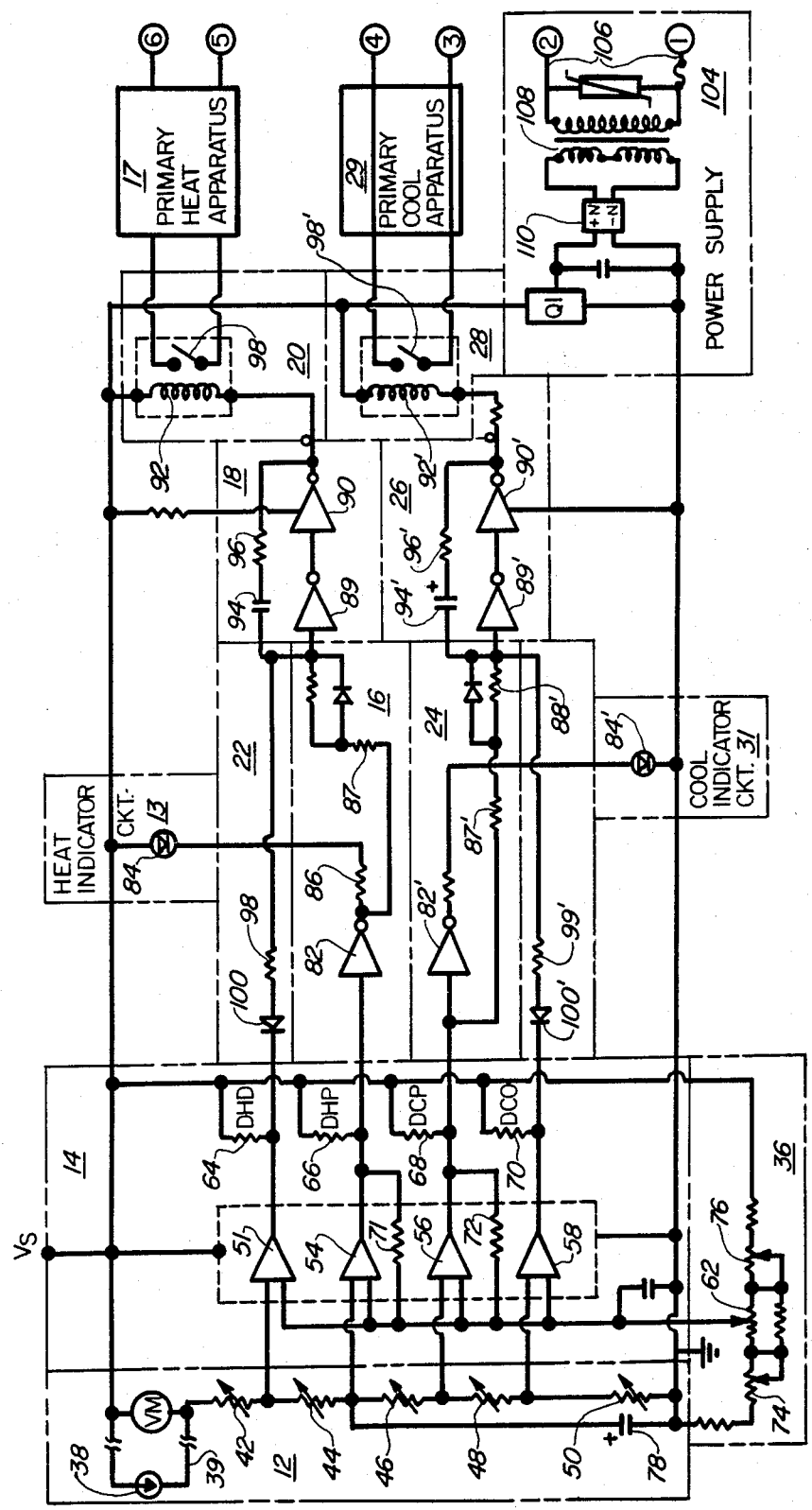
FIG. 2 is a schematic diagram of preferred circuitry for implementing the functional blocks of the electronic thermostat of FIG. 1.

Referring now to FIG. 2, a schematic wiring diagram of a preferred circuit for implementing the functional blocks of FIG. 1 is described. For purposes of simplicity, the second override circuits 21' and 30', the relay driver circuits 18' and 26' and the relay switches 20' and 28' will not be shown further or described. It should be understood that these elements operate in the same or similar manner as their counterparts which are identified herein and will be further described below.

The sensor circuit 12 primarily includes a sensor element 38 remotely connected in series between a regulated supply of D.C. voltage VS, at a magnitude such as twelve volts D.C., and a reference potential, such as ground, to form a current source. The connection circuit to ground is through a plurality of series resistors 42, 44, 46, 48 and 50 that form a voltage divider. The magnitude of the current through resistors varies in direct proportion with variations of temperature of the sensor element 38. Preferably sensor element 38 comprises a two terminal, integrated circuit, linear temperature-current transducer having a linear absolute temperature characteristic, such as transducer AD59, manufactured by Analog Devices of Norwood, Mass.

The resistors 42, 44, 46, 48 and 50 form a voltage divider having four outputs HO (heat override), HP (heat primary), CP (cool primary) and CO (cool override) which are connected between resistor pairs 42 and 44, 44 and 46, 46 and 48, and 48 and 50. Sensor voltage signals are produced on these sensor outputs which vary linearly with changes in current of the sensor circuit source 38 and thus linearly vary with changes of the sensed temperature. The sensor element 38 is preferably located remotely from the remainder of the sensor circuit 12 and connected thereto by means of an elongate coaxial cable 39 or the like. With this remote connection, accuracy is improved. The sensor circuitry is preferably located in a different, more stable thermal environment than the sensor element 38 so as not to be effected thereby. Likewise, effects on the sensor element 38 of heat from the sensor circuitry is avoided to obtain improved accuracy and reliability., The magnitudes of the voltages are different from one another by a proportional amount dependent upon the relative magnitudes of the resistors. In the preferred embodiment, resistors 42, 44, 46 and 48 have a preselected value of one hundred ohms and resistor 50 has a preselected value of twenty kilohms. With a high output current sensor, this results in a voltage difference between successive stages of 0.0298 volts at 25 degrees Centigrade. This represents an interstage or intercycle temperature increment of 1.6 degrees Centigrade for the calibration scale which was selected. Alternately, one or more of resistors 42, 44, 46, 48 and 50 are variable resistors to permit simple adjustment of dead zones and relative actuation temperatures.

The four sensor outputs HO, HP, CP, CO are respectively coupled to inputs of four detectors, or comparators, circuits 52, 54, 56 and 58. The other inputs of these comparator circuits are all connected together by a lead 60 to the wiper of a set point potentiometer 62 of calibration/set point circuit 36 for establishing a variable reference voltage. Whenever a particular sensor output voltage reaches the reference voltage applied to its associated comparator circuit, the comparator circuit generates a detection pulse to indicate that its associated temperature has been reached. The detector outputs DHO, DHP, DCP and DCO are coupled to the D.C. supply voltage VS through individual pull-up resistors 64, 66, 68 and 70, respectively, so that strong 1-state logic signals are produced on the outputs of the comparator circuit whenever they switch to a logic 1-state.

Comparator circuits 54 and 56 are provided with positive feedback resistors 71 and 72. The positive feedback creates a hysteresis in the switching characteristics of the comparator circuit such that generation of a detection pulse occurs at a higher temperature for heat cycle comparator 54 and at a lower temperature for cool cycle comparator 56 than the temperature at which the detection pulse is terminated. A ten megaohm resistor has been found suitable to provide a 0.22 Centigrade degree hysteresis differential which is believed sufficient to prevent relay chatter and minimize rapid cycling. In addition, as generally indicated, a dead zone is created between the heating and cooling cycles and between intracycle stages.

The set point and calibration circuit includes two set point calibration potentiometers 74 and 76 to provide two point calibration. Potentiometer 74 is used to set the upper end of the set point voltage to correspond to the upper limit of the temperature scale, such as one hundred degrees Centigrade, and potentiometer 76 is used to set the lower end of the set point voltage to correspond to the lower limit of the temperature set point scale, such as zero degrees Centigrade. The signal produced on output HP is preferably used as the sensor output for calibration purposes. A capacitor 78 connected to sensor output HP and a capacitor 80 connected to reference voltage lead 60 provide filtering to prevent relay chatter and undesirable switching oscillation.

The remaining circuitry is best described with reference to the various stages of operation. Presume that the set point potentiometer 62 is set to establish a reference voltage corresponding to 25 degrees Centigrade and the sensor is producing a sensor signal representative of 24 degrees Centigrade at sensor output HP. Then the output voltage on output HP will be less than the reference voltage. This condition will cause comparator 54 to switch to a 0-state condition with a 0-state signal on its output DHP equal to zero volts. This 0-state heat detection signal is inverted by an inverter 82 of the relay driver 16 which produces a resultant 1-state signal at its output. This 0-state is also coupled to the remaining time delay portion of the interface circuit 16.

The 1-state detection signal at the output of relay driver circuit 82 is coupled to the heat indicator circuit 13. The heat indicator circuit 13 comprises an LED 84 connected between the negative D.C. supply voltage lead and the output of inverter 82 through a current limiting resistor 86. When the output switches to a 1-state, the LED is caused to light to indicate primary heat is being called for.

The time delay portion of the interface circuit 16 includes a pair of resistors 87 and 88 connected in series between the output of comparator 54 and the input of the first stage amplifier 89 of relay driver circuit 18. The output of amplifier 89 is connected to a second stage amplifier 90, the output of which is connected to one side of a relay coil 92 of heat relay switch 20. The input of amplifier 89 is also coupled to a time delay capacitor 94 which is connected to the positive supply voltage VS.

Before the output of comparator 54 switches to a 0-state, capacitor 94 is charged to the supply voltage VS and thus a 1-state signal is applied to the input of comparator 54, and the relay coil 92 is not energized. However, when the 0-state detection pulse is produced on the output of amplifier 82, the capacitor is discharged through resistors 87 and 88 at a rate dependent upon the values of these components. Preferably, the values are selected so that it takes approximately fifteen seconds for capacitor 94 to discharge to a point where the voltage at the input to amplifier 88 reaches its 0-state threshold. When this happens, amplifier 88 switches its output to a 0-state to actuate relay coil 92. When relay coil is actuated, switch 98 is closed to apply power to the primary heating apparatus 17.

If the pulse does not continue for the time delay period, then the capacitor 94 will be recharged before the input to amplifier 88 reaches a 0-state condition, and the relay coil 92 will not be energized. Thus, false starts due to transient dips in sensed temperatures and rapid cycling are avoided. Rapid cycling is also minimized because of the hysteresis provided by positive feedback resistor 71.

If the temperature continues to fall, then comparator 52 will switch to a 0-state when the temperature drops to the associated heat override temperature. When this happens, capacitor 94 is also discharged through a resistor 98 and a diode 100 of the heat interface circuit 22 at a rate determined in part by the value of resistor 98. Presuming that the principal heat detection pulse on lead DHP was not generated, then the heat override interface circuit 22 will discharge the capacitor in approximately three seconds to the 0-state level or within such other time period as may be selected. If the capacitor is already partially discharged, then the time period will be less. As noted above, with reference to FIG. 1, alternately, or in addition, the heat override interface circuitry is used to drive a separate relay driver circuit 18' to actuate another relay switch 20' which are identical in structure and function as the heat relay driver circuit 18 and the relay switch 20, respectively.

In addition to functioning to couple the override pulse to the relay driver on a time delayed basis, the heat override interface circuit 22 protects motor loads connected to the relay switch 20 from "instant on" activation whenever power is applied. If A.C. power is momentarily lost and then reapplied, the capacitor 94 is quickly recharged through a diode 102 and another delay is required before the capacitor discharges to again energize the relay.

The cool primary interface circuit 24, the cool override interface circuit 30, the cool relay driver circuit 26 and cool relay switch 28 are virtually identical in structure and function as the corresponding circuits of the heat cycle circuitry, the heat primary interface circuit 16, heat override interface circuit 22, heat relay driver circuit 18 and heat relay switch 20, respectively, except as indicated. All corresponding parts operate in substantially the same way except as indicated, and thus the operation will not be described in detail. Corresponding parts have been given the same reference numeral followed by a prime mark. An amplifier 82' generates a 1-state pulse to cause an LED 84' to provide a light indication that a 0-state cool primary detection pulse has been generated on output DCP. At the same time, the 0-state pulse cause a capacitor 94' to discharge through resistors 96', 88' and 87'. A diode 102' is provided to quickly charge capacitor 94' when power is reapplied. The detection pulse is amplified by amplifiers 89' and 90' and applied to a relay coil 92' to close a switch 98' and actuate primary cooling apparatus 29. If the temperature rises to the cool override detection temperature, then a 0-state cool override detection pulse will cause discharge of capacitor 94' through a diode 100' and a resistor 98.

The second override/third stage heat and cool circuits 21' and 30' are constructed substantially the same and operate the same as the first override/second stage heat and cool circuits 21 and 30, respectively.

The cooling apparatus 29, 32 and 33 may comprise any type or combination of devices, including electric or fuel powered cool air conditioning units, ventilation controls, fans, dehumidifiers or the like. Twelve volt D.C. power is provided on power terminal VS by a suitable power supply circuit 104 having a pair of leads 106 for connection with an A.C. power source, and a transformer 108, rectifier 110, a capacitor 112 and a transistor 114 for producing a regulated D.C. voltage therefrom.

Figure 3:
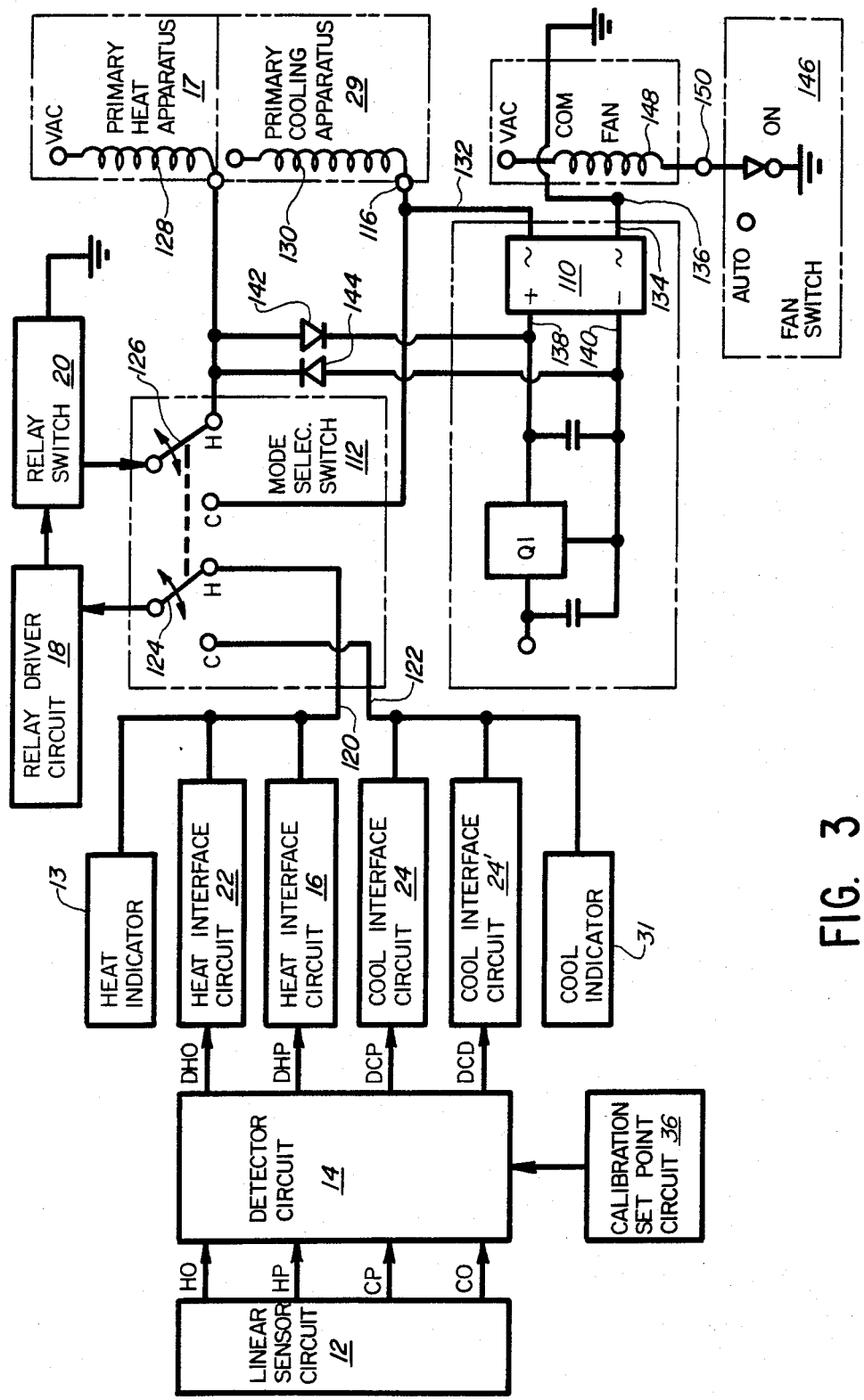
FIG. 3 is a combined functional block and schematic diagram of one form of the preferred embodiment of the electronic thermostat of the present invention.

Referring now to FIG. 3, the preferred embodiment of the present invention is seen to be similar to the electronic thermostat of FIGS. 1 and 2. In fact, the elements of the thermostat of FIG. 3 which are identical in structure and function as corresponding elements of FIG. 2 have been given the same reference numeral and will not be described further.

Relative to the thermostat of FIGS. 1 and 2 changes have been made to achieve the objectives of the present invention. First, a mode selection switch 112 has been added to select one of a heat control output terminal 114 and a cool control output terminal 116. The mode selection switch also is used to select a trigger signal output from either the heat interface circuits 16 and 22 produced on their common output 120 or the cool interface circuits 24 and 24' on their common output 122.

Advantageously, this mode switch 112 eliminates the need for multiple relay driver circuits 18', 26 and 26' and multiple relay switches 20', 28 and 28' of FIG. 1. Instead a single relay switch 20 driven by a single relay driver circuit 18 is shared by multiple interface circuits 22, 16, 24 and 24'.

When the mode selection switch 112 is in the heat position, as shown, then a first switch element 124 connects the heat trigger output 120 to the input of relay driver circuit 18 and a second switch element 126 connects the actuation output signal from relay switch 20 to heat control output terminal 114.

When the mode selection switches in the opposite, cool position, then the first switch element couples the cool trigger output to the input of relay driver unit 18 and element 126 couples the actuation signal from relay switch 20 to the cool control terminal 116.

As described above with reference to FIG. 2, the actuation signal is generated only a preselected time period after the preselected temperature is reached due to a time delay circuit. In keeping with one aspect of the invention, a capacitor element of this time delay is included as part of the relay driver circuit 18 on one side of the mode selection switch 112 which is shared by individual resistors of the interface circuits 22, 16, 24 and 24' at the other side of the mode selection switch 112. Even though the capacitive element is the same for all the time delay circuits the different time delay periods advantageously need not be the same, for different delay periods are obtained for the different interface circuits 12, 16, 24 and 24' by selecting time delay resistors of different values.

The other principal change which has been made in the thermostat of FIG. 3 relative to that of FIG. 2 is in the power supply 104'. In the thermostat of FIG. 2, D.C. supply voltage VS was produced from a 115 V A.C. power drawn through dedicated input power leads 106 and a step down transformer 108. Thus, two separate leads 106 were required for operation.

This need for separate leads is eliminated in accordance with the present invention by selectively drawing A.C. power from the reduced A.C. voltage source VAC used to energize the control relay coils 128 and 130 associated respectively with the primary heating apparatus 17 and the primary cooling apparatus 29. Output terminals 114 and 116 are respectively connected to these relay coils and A.C. power is selectively drawn through these terminals.

The separate A.C. input power terminals associated with transformer 108 are eliminated. Instead the A.C. power input terminals 132 and 134 are respectively coupled to the cool control terminal and a common reference terminal 136, held at a reference potential, such as ground. Advantageously, the transformer 108 is also eliminated since the A.C. voltage provided through the control relay coils 128 and 130 is at a lower magnitude such as twelve or twenty-four volts A.C., so that a transformer is not needed. Also, the D.C. power supply output terminals 138 and 140 are respectively connected to heat control output terminal 114 through diodes 142 and 144.

The diodes 142 and 144 cooperate with the mode selection switch 112 and the full wave rectifier 110 to selectively produce D.C. power from A.C. power drawn through the cool output control terminal 116 or the heat output control terminal 114. When the mode selection switch 112 is in the heat position and the primary heat apparatus 17 actuated, then A.C. power is drawn through cool output control terminal 116. However, when the mode selection switch 112 is in the cool position and a cool actuation signal applied thereto, the A.C. power is drawn through the heat output terminal 114 through means of diodes 142 and 144.

In many air temperature control systems, a fan is required which is controlled via another fan switch 146. When the fan switch 146 is in the continuous on position as shown, a fan relay coil 148 connected to a fan control output terminal 150 is connected to ground reference potential through fan switch 146 and energized continuously. When the switch is in the opposite AUTO position, the fan coil 148 is only energized when an actuation signal from terminals 114 and 116 (connection not shown) is applied to the fan relay coil 148 thorugh the AUTO terminal of the fan switch 146.

Figure 4:
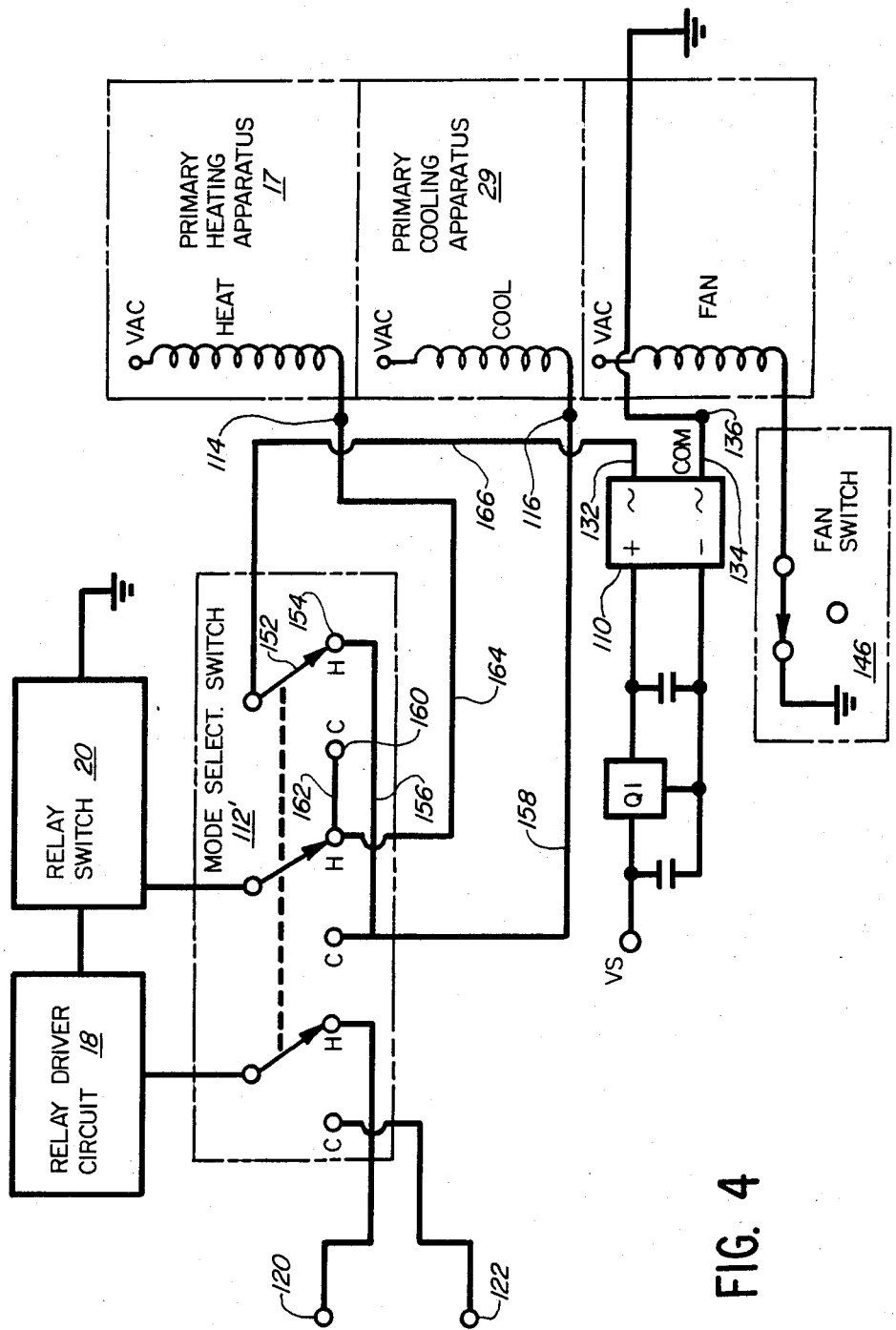
FIG. 4 is a combined functional block diagram and schematic wiring diagram of another form of the preferred embodiment.

Turning now to FIG. 4, another invention is shown in which the function performed by diodes 142 and 146 is performed by an additional switch section with a switching element 152 of a switch 112'. Switch 112' is identical to switch 112 except for the addition of the section associated with switching element 152. This section has a fixed heat contact 154 connected through a lead 156 and a lead 158 to the cool output terminal 116. It also has a fixed cool contact 160 connected through a lead 162 and a lead 164 to the heat output control terminal 114. The switch element 152 is fixedly connected through a lead 166 to AC input terminal 132 of the full wave rectifier 110.

The A.C. input power for the D.C. power supply is drawn from the one output control terminal which has not been preselected by the mode selection switch 112' for receipt of actuation signals. When the mode selection switch 112' is in the heat position, as shown, A.C. power is coupled from the cool control output terminal 116 to A.C. input 132 of full wave rectifier 110 via lead 158, lead 156, control 154 and lead 166. Alternately, when the mode selection switch 112' is in the cool position, opposite to that shown, A.C. power is coupled from the heat control output terminal 114 to the A.C. power input 132 via lead 164, lead 162, fixed switch contact 160, switch element 152 and lead 166. Thus, the same mode selection switch which selects the appropriate interface current and output terminal also functions to select an appropriate one of the output terminals from which to draw A.C. power.

Figure 5:
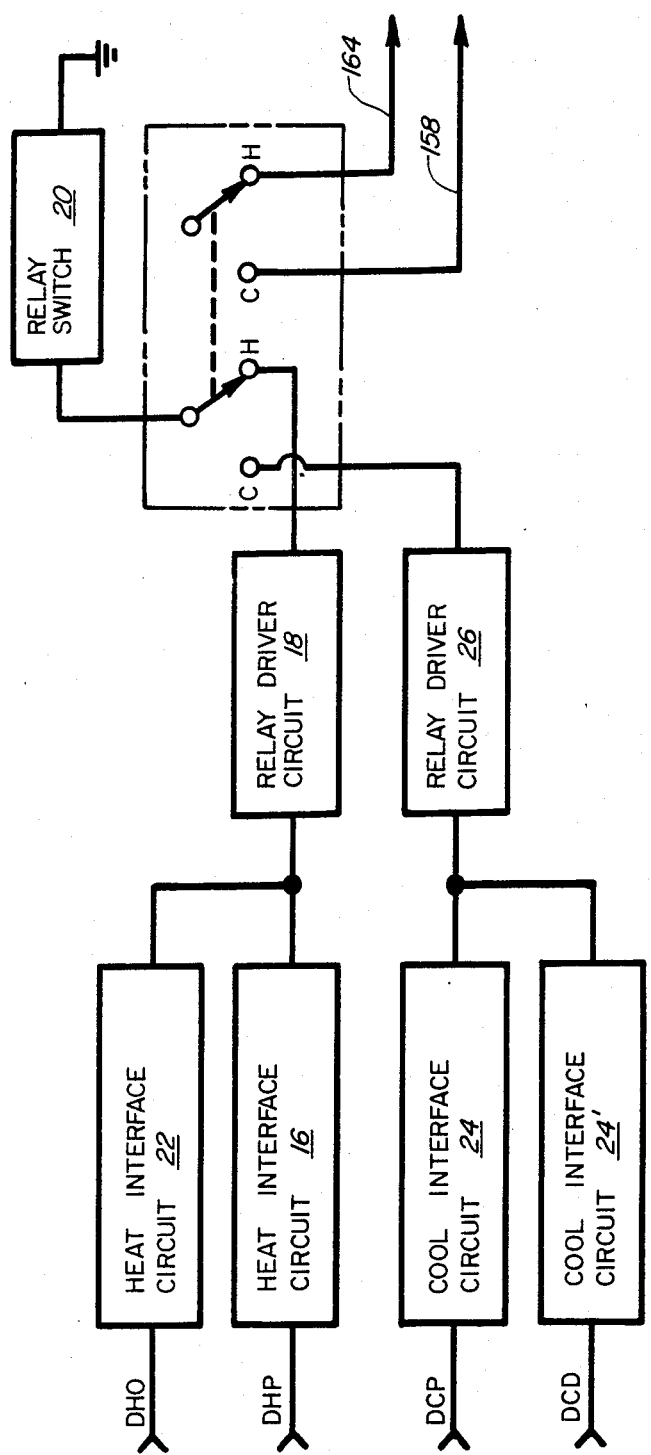
FIG. 5 is a combined functional block and schematic wiring diagram of yet another form of the present invention in which, unlike the first two forms, two separate delay circuits are used in combination with a shared actuator.

It is preferred to minimize the number of relay drivers required through switched alternate use of a single relay driver circuit 18. However, as seen in an alternate embodiment of FIG. 5, a second relay driver circuit 26 can be alternately coupled through the mode selection switch 112' to a single shared relay switch 20.

While preferred and alternate embodiments have been disclosed, it should be appreciated that many other variations may be made without departing from the spirit of the invention and the scope of the appended claims.

We claim:

1. An electronic thermostat, comprising
means for sensing temperature;
a reference terminal for connection with a common reference potential, such as ground;
a heat control terminal for connection with a control relay coil of a heating apparatus;
a cool control terminal for connection with a control relay coil of a cooling apparatus;
a switch for preselecting one of said control terminals;
means for applying actuation signals to the preselected one of said control terminals to energize a control relay connected therewith;
means for providing D.C. power to said actuation signal generating means from A.C. power drawn through the other nonselected and non-actuated control terminal at a level insufficient to energize a relay control coil of a temperature altering apparatus connected therewith.

2. The electronic thermostat of claim 1 in which said D.C. power producing means includes a rectifier circuit having one input connected to one of said heat control and cool control terminals and another input connected to said reference terminal.

3. The electronic thermostat of claim 1 or 2 in which said actuation signal applying means includes means for applying the reference potential to said control terminals to energize a control relay coil connected therewith.

4. The electronic thermostat of claim 1 or 2 in which said D.C. power supplying means includes means for selectively drawing power through one of the control terminals at times when an actuation signal is applied to the other control terminal.

5. The electronic thermostat of claim 4 in which said selective power drawing means includes a switch for connecting one of the control terminals to the one input of the rectifier circuit when the other terminal has been selected for application of actuation signals in accordance with sensed temperature.

6. The electronic thermostat of claim 4 in which said switch comprises one section of a multiple throw manually actuated switch and in which another sections of said switch comprises means for selecting the control terminal for receipt of said actuation signal.

7. The electronic theremostat of claim 4 in which said switch is a semiconductor switch including a diode for deriving power thorugh one of said control terminals when an actuation signal is being applied to the other control terminal.

8. An electronic thermostat, comprising:
means for sensing temperature;
means for generating a heat trigger signal in response to the sensed temperature decreasing to a preselected heat actuation temperature;
means for generating a cool trigger signal in response to the sensed temperature increasing to a preselected cool actuation temperature;
means for preselecting for receipt of actuation signals one of a cool output terminal and a heat output terminal for connection with a heating apparatus and a cooling apparatus, respectively;
means responsive to said trigger signal for applying actuation signals to the preselected one of output terminals to control the apparatus connected therewith a preselected time period after the preselected actuation temperature is sensed;
each of said trigger signal generating means include means for delaying generation of a trigger signal for a preselected time period after sensing the actuation temperature associated therewith;
said applying means including a heat delay circuit for delaying the heat trigger pulse and a cool trigger delay circuit for delaying the cool trigger signal; and
said heat delay circuit and said cool delay circuit sharing a common circuit element.

9. The electronic thermostat of claim 8 in which said preselecting means comprises a switch having one state in which the actuation signal is applied to the cool output terminal and another sate in which the actuation signal is applied to the heat output terminal.

10. The electronic thermostat of claim 8 in which each of said trigger signal generating means include means for delaying generation of a trigger signal for a preselected time period after sensing the acutation temperature associated therewith.

11. The electronic thermostat of claim 8 in which each of said heat delay and cool delay circuits have a unique element which cooperates with said shared circuit element to uniquely establish the duration of said time delay period associated therewith.

12. The electronic thermostat of claim 11 in which said common circuit element is a capacitor and said unique elements comprise resistors.

13. The electronic thermostat of claim 8 in which said actuation signal applying means includes means for generating an actuation signal in response to application of a trigger signal thereto, and means for selectively switching said trigger signal to said actuation signal generating means in accordance with the sensed temperature.

14. An electronic thermostat, comprising
means for sensing temperature;
a heat control terminal;
a cool control terminal;
a reference terminal;
means for generating a heat trigger signal a preselected time delay after a preselected heat actuation temperature has been sensed;
means for generating a cool trigger signal a preselected time delay after a preselected cool actuation temperature has been sensed;
means responsive to said trigger signals for generating an actuation signal;
a switch having a heat position in which the heat trigger signal is connected to the actuation signal generating means and the actuation signal is connected to the heat control terminal and a cool position in which the cool trigger signal is connected the actuation signal generating means and the actuation signal is connected to the cool control terminal; and
a power supply for providing D.C. power from A.C. power drawn through the control terminals, said power supply drawing A.C. power from the heat terminal when the switch is in the cool position and drawing A.C. power from the cool terminal when the switch is in the heat position.

15. The electronic thermostat of claim 14 in which each of said trigger signal generating means includes a time delay circuit, said time delay circuits having a first circuit element which is shared by them and connected on one side of said switch and a unique second circuit element which is connected to the first circuit element through the switch.

16. The electronic thermostat of claims 14 or 15 in which the time delay of the heat trigger signal generating means is selectively different than that of the cool trigger signal generating means.

17. The electronic thermostat of claim 14 or 15 in which each of said trigger signal generating means includes a time delay circuit located on a side of the switch opposite the side to which is connected the actuation signal generating means.

18. The electronic thermostat of claim 14 or 15 including means responsive to the temperature sensing means for selectively altering said trigger signal time delays.

* * * * *

UNITED STATES PATENT AND TRADEMARK OFFICE
CERTIFICATE OF CORRECTION

PATENT NO. : 4,534,406

DATED : Aug. 13, 1985

INVENTOR(S) : Alfred T. Newell III and Alfred T. Newell, Jr.

It is certified that error appears in the above-identified patent and that said Letters Patent is hereby corrected as shown below:

(75) Inventors: delete the comma after "Newell" (first occurrence);

Col. 2, line 16, change "alterning" to - altering -;

Col. 2, line 54, after "is" insert - a -;

Col. 7, line 2, delete the comma after the period;

Col. 9, line 23, change "cause" to - causes -;

Col. 11, line 10, change "thorugh" to - through -;

Col. 11, line 12, after "another" insert - embodiment of the -;

Col. 12, line 27, change "sections" to - section -;

Col. 12, line 30, change "theremostat" to - thermostat -;

Col. 12, line 32, change "thorugh" to - through -;

Col. 12, line 64, change "sate" to - state -; and

Col. 13, line 1, change "acutation" to - actuation -.

Signed and Sealed this

Seventeenth Day of November, 1987

Attest:

DONALD J. QUIGG

*Attesting Officer*  *Commissioner of Patents and Trademarks*